Nov. 19, 1968    W. C. ROCKWELL    3,411,430
CONTINUOUS GRAIN PUFFER

Filed March 22, 1967    2 Sheets-Sheet 1

W.C. ROCKWELL
INVENTOR
BY R. Hoffman
ATTORNEY

United States Patent Office 3,411,430
Patented Nov. 19, 1968

3,411,430
CONTINUOUS GRAIN PUFFER
William C. Rockwell, El Cerrito, Calif., assignor to the United States of America as represented by the Secretary of Agriculture
Filed Mar. 22, 1967, Ser. No. 625,916
4 Claims. (Cl. 99—238)

ABSTRACT OF THE DISCLOSURE

Apparatus for treating grain or other particulate material with hot gases for the purpose of puffing, roasting, drying, etc. which includes a cylindrical vessel provided with a rotating assembly of radial vanes. Material is fed into the pockets between adjacent vanes whereby the material is conveyed from a feeding station to a discharge station while it is subjected to a stream of hot air jetting upwardly from an arcuate slot extending about the inner periphery of the vessel. Intimate contact of the material and the hot gas within each pocket is enhanced by the provision of a conical plate which forms a downwardly and outwardly sloping base for the pockets.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel apparatus for treating food and feed products with gaseous media. The apparatus of the invention is particularly adapted for contacting grain with hot air to produce puffed grain products and its application in this area will be stressed herein. Further objects of the invention will be evident from the following description and the annexed drawings.

Figure 1:
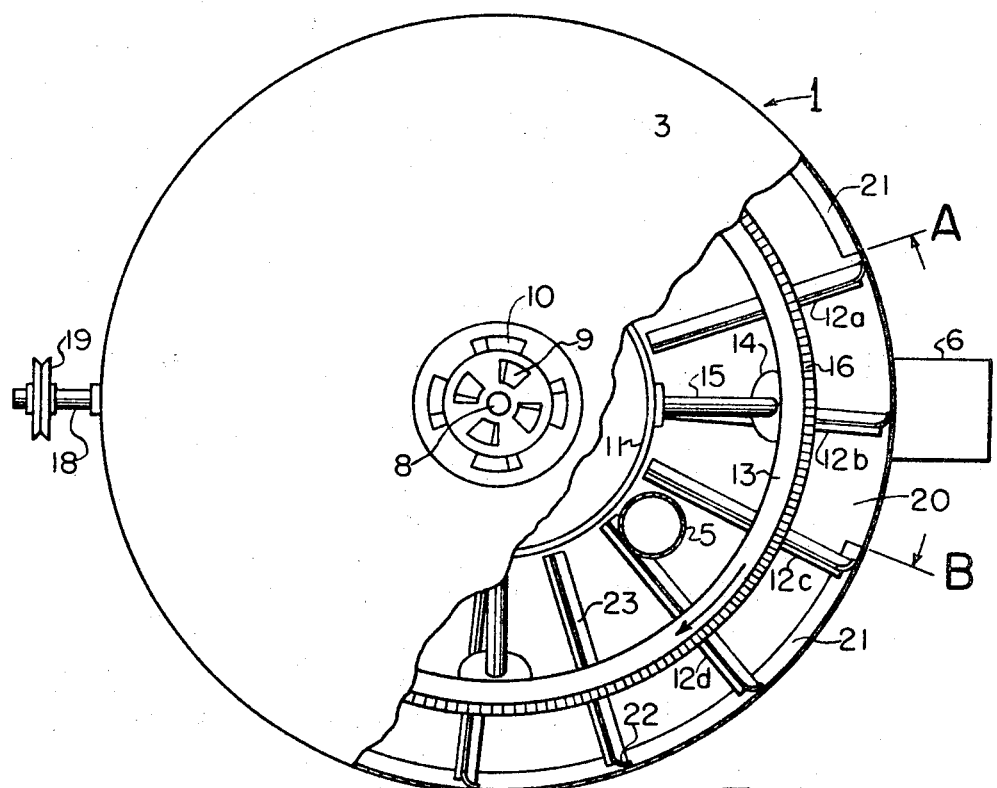
Figure 3:
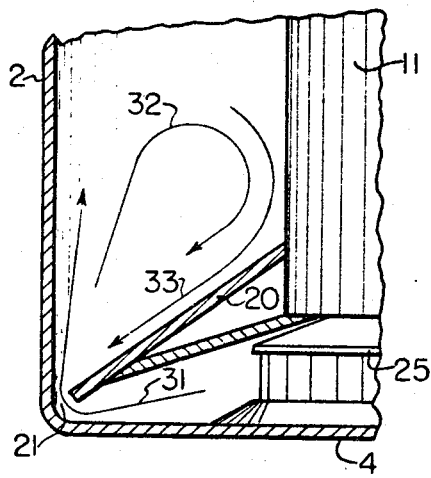
Figure 2:
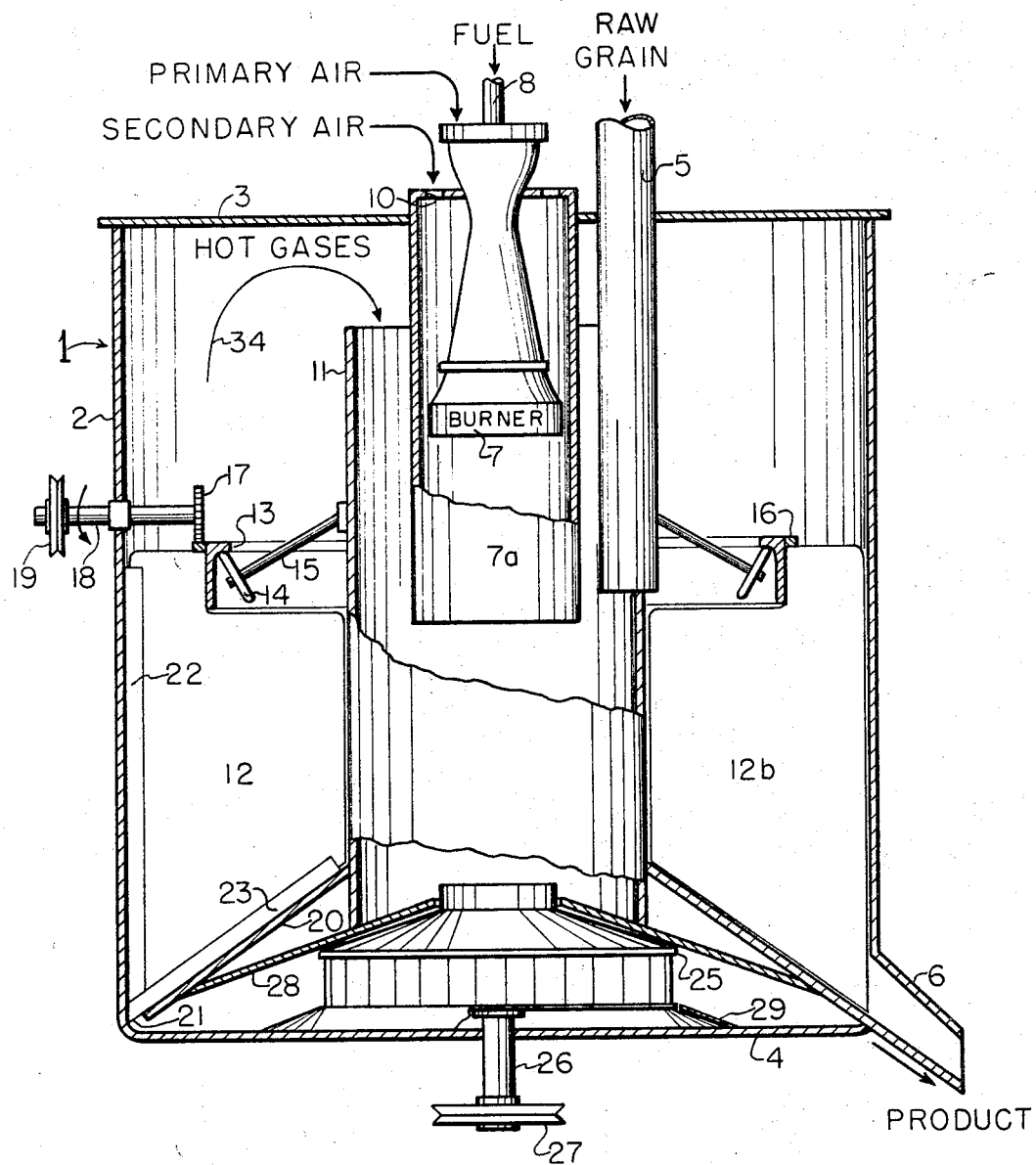

In the drawings attached hereto, FIGURE 1 is a plan view of the apparatus of the invention, a portion of the top of the device being broken away to illustrate internal structure. FIGURE 2 is a front view of the apparatus, in cross-section, with several parts broken away to illustrate internal structure. FIGURE 3 is a fragmentary view illustrating the movement of hot air and grain within an individual pocket of the apparatus.

Grains are used as such and in mixed feeds for various farm animals including cattle, sheep, swine, poultry, etc. It has been shown in recent years that puffed grains are more efficient feedstuffs than the grains in the ordinary condition, i.e., whole, cracked, or the like. It is generally believed that the expanded volume and porous texture of the grains render them more readily digestible so that pound-for-pound they provide a greater increase in weight of the animals than the untreated grain.

The apparatus of the invention is primarily adapted for producing puffed grains on a continuous basis and provides a high production output for a relatively simple and inexpensive structure.

Referring to the annexed drawings, especially FIGS. 1 and 2, the construction and operation of the apparatus of the invention are described in detail as follows:

The apparatus includes a cylindrical vessel, generally designated as 1, defined by circular wall 2, top 3, and base 4.

The grain to be treated—for example, corn, wheat, barley, oats, milo, rice, etc.—is fed into vessel 1 via pipe 5. The puffed product is discharged from vessel 1 through a port cut into the base of wall 2 which communicates with discharge chute 6.

Centrally located in vessel 1 is a burner 7, supplied with fuel (natural gas or other gaseous or liquid fuel) via pipe 8. Primary air for combustion is fed to burner 7 via ports 9, equipped with conventional adjustable shutters. Additional air as necessary for proper operation of the system is fed into combustion chamber 7a via secondary ports 10, also provided with conventional adjustable shutters. It is evident that the combustion of fuel produces a mass of hot gas within the cylindrical, open-topped chamber, or plenum, 11.

For containing and conveying the material under treatment there are provided a series of radial vanes 12, forming a plurality of treatment pockets between pairs of adjacent vanes. (Several of the vanes are specifically designated as 12a, 12b, 12c, etc. for purpose of explaining the action of the apparatus.) Each of the individual vanes is fixed to a circular, flanged hoop 13, whereby the vanes are maintained as a unitary assembly. The assembly of vanes is rotatably suspended about chamber 11 by a series of idler pulleys 14 mounted on shafts 15 attached to chamber 11. Welded to the outer periphery of hoop 13 is a conventional roller chain 16. This chain is engaged by sprocket 17 carried on shaft 18. It is obvious that by rotation of pulley 19, keyed to shaft 18, the assembly of vanes 12 is rotated as a unit. In operation, the speed of rotation of the vane assembly is adjusted so that the grain remains in the system long enough to be puffed to the desired extent.

Near the base of vessel 1 is mounted a cone 20 which serves not only as a floor for the treatment pockets between adjacent vanes 12, but also provides a slot 21 for passage of a high-velocity stream of hot gas into the pockets. Cone 20 is so fabricated that slot 21 extends about the entire periphery of vessel 1 except for the distance between points A and B (see FIG. 1) where the periphery of cone 20 is extended right to the circular edge of vessel 1. This blocking of the slot between points A and B has the function that discharge of product into chute 6 is not impeded by any upward draft of gas.

To minimize movement of material from one treatment pocket to another and to assure positive conveyance of material under treatment, there are provided sealing strips 22 and 23 fixed to the outer edges and bottom edges, respectively, of vanes 12. These sealing strips may be of full-hard stainless steel shim stock or other heat-resistant flexible material. Generally, sealing strips are not required at the inner edges of the vanes, although these may be provided if desired or necessary for treating a particular grain.

At the base of vessel 1 is provided an impeller fan 25 rotated by shaft 26 and driven pulley 27. In operation impeller 25 draws hot gas from within chamber 11 and forces it through slot 21 into the treatment pockets where it contacts the material to be puffed. Conical shroud 28 is provided to prevent short-circuiting of the gas flow; conical ring 29 is provided to prevent foreign material from getting under impeller 25 and fouling it.

In operating the device, burner 7 is activated to provide hot gas (for example, at 500–1200° F.), impeller 25 is rotated to produce the desired circulation of hot gas, and the vane assembly is rotated while grain is fed continuously into pipe 5. As a pair of vanes come into position below the feed pipe—i.e., the position shown by vanes 12-c and 12-d in FIG. 1—grain drops into the pocket formed by these vanes. The rate at which the raw material is fed into the system is so regulated that the volume of grain introduced into the pocket is only a fraction—for example, about ½₀ to ⅒—of the volume of the pocket, whereby to allow sufficient room for the grain to be tumbled about by the stream of hot air entering the pocket. As the vane assembly continues to rotate, the grain is contacted with and tumbled about by the jet of hot gas entering the pocket via slot 21. By the time this allotment of grain is puffed it is adjacent to discharge chute 6—i.e., in the position between the vanes designated 12a and 12b in FIG. 2. In this area the flow of hot air is cut off by the blockage of slot 21 and the puffed product is discharged from the system. It is obvious that in continued operation, each pocket, in turn, functions to receive an allotment of grain, hold it during puffing treatment, and then discharge the product.

A special feature of the invention lies in the provision of slot 21 and co-operating structure whereby the grain is exposed to a high velocity jet of hot gas. Such jet action creates a strong turbulent effect whereby the hot gas and grain are very intimately contacted with one another. The end result is that the desired puffing takes place very rapidly and uniformly as to each individual kernel under treatment.

The action which takes place in an individual treatment pocket is illustrated in FIG. 3. Referring thereto, hot gas is forced by impeller 25 through slot 21 in the direction exemplified by arrow 31. The upwardly moving jet of hot gas in the pocket causes a turbulent movement of kernels in the directions exemplified by arrows 32 and 33. The net result is a rapid circulation of the grain whereby kernels are repeatedly re-exposed to fresh portions of hot gas as they descend to the base of cone 20. Important in attaining the desired effect is the sloping surface of cone 20 which directs the kernels back to the area near slot 20 for re-exposure to hot gas. The construction of cone 20 thus prevents stagnation and, indeed, promotes the desired circulatory effect.

It is evident that there is a continuous circulation of gas through the system. The gas rising through the various allotments of grain in the several pockets (and rapidly cooled by contact with grain) flows upwardly and then is drawn into chamber 11 (as indicated by arrow 34 in FIG. 2) whereby the gas is reheated and further recirculated through the grain.

The invention is further demonstrated by the following illustrative example.

Milo was puffed in the device described above wherein vessel 1 was 4 ft. in diameter, 5 ft. high, and the vanes 12 were 3 ft. tall. The raw milo was fed into the system at a rate of 1300 lbs. per hour and the vane assembly was rotated at a speed to provide a residence time of 15 seconds. Temperature of the hot air was 1000° F. and the velocity of the hot air stream issuing through slot 21 was on the order of 4500 ft./min. The puffed product was discharged at the rate of 1170 lbs./hr. In contrast to the raw material—hard, round seeds—the product had an expanded volume and a porous texture. In fact, the product was like popcorn because of the eversion effect which is brought about by endospermic material bursting through the outer shell of the grain. Indeed, the product could be eaten just like popcorn.

Although the device of the invention is primarily adapted for the puffing of grains, it may be employed to effectuate diverse types of operations which involves contacting particulate solid material with a gaseous agent. In any such applications, the apparatus of the invention provides an intimate contacting of the particulate material with the gaseous agent, under the turbulent conditions created by the upwardly-jetting gas stream, whereby the desired treatment is effectuated rapidly and uniformly as to each individual particle in the mass of material being processed. Typical applications of the apparatus of the invention, in addition to those noted above, are provided below by way of illustration but not limitation:

The apparatus can be employed for the puffing of various food products such as potatoes, carrots, apples, sweet potatoes, or other fruits or vegetables in particularte form such as dice, slices, chips, or the like, or, in whole form with smaller products such as peas, beans, lentils, etc. Other products which can be puffed are processed grains, as for example: parboiled rice; bulgur in whole or cracked form; and peeled wheat products in raw or pre-cooked form such as those described in U.S. Patent 3,264,113.

The device of the invention can also be used for the roasting of all kinds of food products, for instance, coffee beans, grains, legume seeds, etc. A typical example in this area is the treatment of raw soybeans in the apparatus, applying the air stream at about 600° F., whereby to obtain roasted soybeans having significant advantages in food and feed use. Thus, in the roasting, the skins are cracked and made brittle so that they can be removed by rubbing or similar mechanical action; the nauseating taste of the raw beans is replaced by a nut-like flavor; and the trypsin inhibitor (a natural component of the raw beans which interferes with digestion thereof) is believed to be destroyed.

The device of the invention can be used as a dehydrator to obtain moisture removal without appreciable puffing or roasting effects by cutting down the temperature of the gas stream to levels conventionally employed in dehydration. In such application, the device may be applied to fruits, vegetables, meats, and other foods in piece form. The device of the invention may also be utilized for blanching or cooking all kinds of particulate foods. In such applications, steam or water sprays may be introduced within chamber 11 so that the gas stream contacting the food will effect the desired blanching or cooking without concomitant dehydration, or, with a desired degree of concomitant dehydration by suitable regulation of the amount of moisture fed into chamber 11. Also, during use of the device of the invention in such applications as puffing, cooking, blanching, dehydration, etc., the gas stream can be used as a convenient means for contacting the food pieces with a desired agent. Thus, one may introduce into chamber 11 such agents as wood smoke to provide the products with a smoky flavor or preservative agents such as sulphur dioxide to prevent darkening of the products.

Having thus described the invention, what is claimed is:

1. An apparatus for treating particulate material with a gaseous medium comprising, in combination:
   (a) a rotatable assembly of radial vanes,
   (b) means for rotating said assembly,
   (c) a first circular wall, disposed about said assembly,
   (d) a second circular wall, disposed centrally of said assembly,
   (e) a downwardly-flaring conical imperforate base plate beneath said assembly,
   (f) said vanes cooperating with the first circular wall, the second circular wall, and the base plate to define a series of pockets for receiving and holding material and for moving the material in a circular path on said base plate,
   (g) an arcuate slot beneath said assembly, extending about the inner periphery of the first circular wall, and communicating with said pockets,
   (h) means for forcing a high-velocity stream of gas upwardly through said slot and into said pockets for contact with material contained therein,
   (i) means for feeding material to be treated into said pockets as the assembly rotates, and
   (j) means for dsicharging treated material from said pockets as the assembly rotates.

2. An apparatus for treating particulate material with a gaseous medium comprising, in combination:
   (a) a cylindrical vessel mounted with its axis vertical, and having a bottom and a circular side wall,
   (b) a cylindrical chamber concentrically mounted within said vessel,
   (c) a downwardly flaring conical imperforate base plate within the vessel, spaced above the bottom thereof to provide a gas passageway between the base plate and the bottom of the vessel, the outer periphery of the base plate being spaced from the said circular wall to provide a narrow arcuate slot communicating with said gas passageway, (d) an assembly of radial vanes mounted for rotation in the annular space between the chamber and the circular wall of the vessel, said vanes cooperating with the said circular wall, chamber, and the base plate to define a series of pockets for receiving and holding material, and for moving the material in a circular path on said base plate, (e) means for rotating said assembly, (f) means for forcing a high-velocity stream of gas through said gas passageway, upwardly through said slot, and into said pockets for contact with material contained therein, (g) means for feeding material to be treated into said pockets as the assembly rotates, and (h) means for discharging treated material from said pockets as the assembly rotates.

3. A grain puffer comprising, in combination:

(a) a cylindrical vessel mounted with its axis vertical, and having a bottom and a circular side wall, (b) a cylindrical chamber concentrically mounted within said vessel, (c) a downwardly-flaring conical base plate within the vessel, spaced above the bottom thereof to provide a gas passageway between the base plate and the bottom of the vessel, the outer periphery of the base plate being spaced a short distance from the said circular wall to provide a narrow arcuate slot communicating with said gas passageway, (d) an assembly of radial vanes mounted for rotation in the annular space between the chamber and the circular wall of the vessel, said vanes cooperating with the said circular wall, chamber, and base plate to provide a series of pockets for receiving and holding material, (e) means for rotating said assembly, (f) means for introducing hot gas into said chamber, (g) means for forcing hot gas from said chamber, through said gas passageway, upwardly through said slot, and into said pockets as a high-velocity stream, whereby grain contained in said pockets is subjected to intimate contact with the hot gas under turbulent conditions to cause rapid and uniform puffing of the grains, (h) means for feeding grain to be puffed into said pockets as the assembly rotates, and (i) means for discharging puffed grain from said pockets as the assembly rotates.

4. A grain puffer comprising, in combination:

(a) an imperforate base plate of frusto-conical form, mounted with its axis vertical and its inner rim higher than its outer rim to provide a sloping support surface for grain to be puffed, (b) means for moving grain in a circular path on said base plate, (c) an arcuate slot adjacent the outer rim of said base plate, and concentric with said outer rim, (d) means for forcing a high-velocity stream of hot gas upwardly through said slot, (e) the sloping surface of said base plate coacting with the upwardly moving gas stream to provide an intense circulation of the grain and an intimate contact of the grain with the hot gas whereby rapid and uniform puffing of the grain takes place.

References Cited

UNITED STATES PATENTS

| | | | |
|---|---|---|---|
| 2,093,270 | 9/1937 | Glinka | 34—187 XR |
| 2,119,790 | 6/1938 | McGehee et al. | 263—21 |
| 2,256,017 | 9/1941 | Corran | 34—187 XR |
| 2,392,283 | 1/1946 | Ferre | 34—187 XR |
| 3,189,460 | 6/1965 | Smith | 99—236 XR |
| 3,311,993 | 4/1967 | Bersano | 34—57 |

FOREIGN PATENTS 1,360,363  3/1964  France.

WALTER A. SCHEEL, *Primary Examiner.*

JOHN M. NEARY, *Assistant Examiner.*